March 31, 1959

P. SPENCE 2,879,792

INTEGRAL-PILOT VALVE

Filed June 20, 1952

INVENTOR.
PAULSEN SPENCE
BY Mitchell & Bechert
ATTORNEYS

United States Patent Office 2,879,792
Patented Mar. 31, 1959

2,879,792

INTEGRAL-PILOT VALVE

Paulsen Spence, Baton Rouge, La.

Application June 20, 1952, Serial No. 294,637

2 Claims. (Cl. 137—489.5)

My invention relates to valves and, in particular, to an improved pressure-regulating valve of the general type disclosed in my Patent No. 2,639,556, issued May 26, 1953.

It is an object of the invention to provide an improved valve construction of the character indicated.

It is another object to provide an improved regulating-valve construction having features of ruggedness, adaptability, and quick and easy servicing.

It is also an object to provide an improved valve for handling very-high-pressure fluids.

It is a specific object to provide a valve construction wherein wire-drawing around pilot-valve parts may be minimized.

Figure 2:
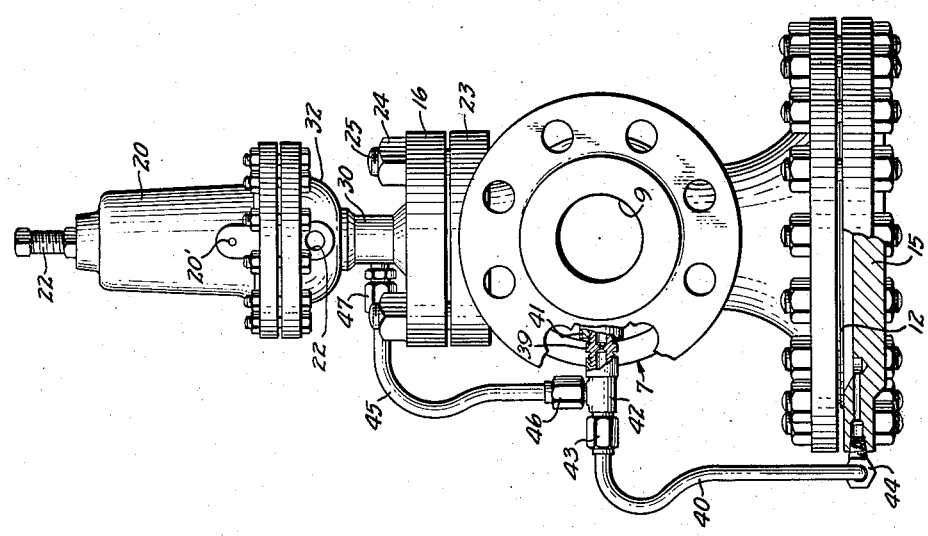
Figure 1:
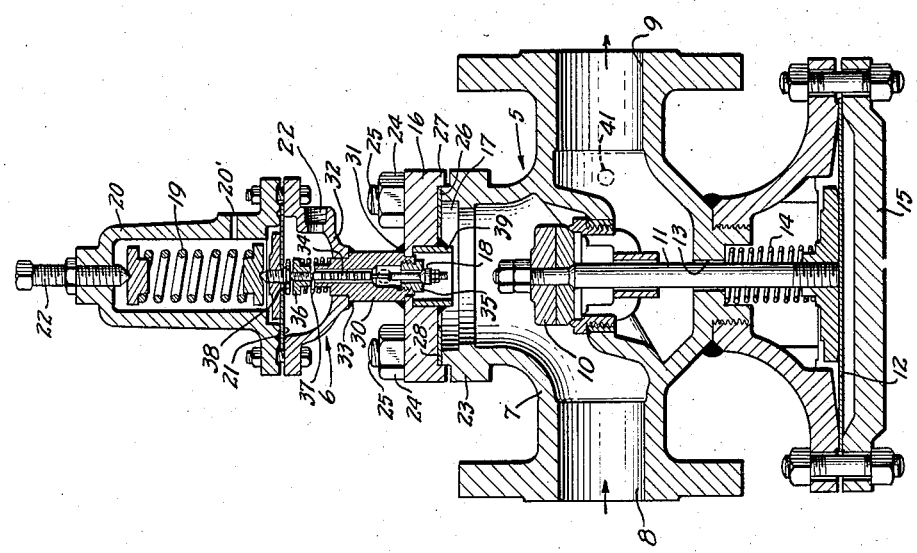

Other objects and various further features of the invention will be pointed out or will occur to those skilled in the art from a reading of the following specification, in conjunction with the accompanying drawings. In said drawings, which show, for illustrative purposes only, a preferred form of the invention:

Fig. 1 is a front, vertical, sectional view through a valve incorporating features of the invention; and Fig. 2 is a partly broken-away side view of the valve of Fig. 1.

Briefly stated, my invention contemplates an improved regulating-valve construction embodying a pilot valve in unit assembled relation with a main valve. The pilot may be incorporated into the customary cover or bonnet over the bonnet opening on the high-pressure side of the main valve. In the specific form to be described, readily detachable connections are provided between the pilot valve and the pressure-responsive actuator for the main valve, and between these members and the low-pressure side of the main valve. The present specific construction also features a novel employment of materials of elevated hardness in the pilot-valve parts, whereby wire drawing, due to possible leakage between interfitting parts of different hardness, is reduced to negligible proportions.

Referring to the drawings, my invention is shown in application to a regulating-valve assembly comprising a main-valve unit 5 and a pilot-valve unit 6. The main-valve unit includes a body 7 having an inlet or high-pressure side 8, and an outlet or low-pressure side 9. A main-valve member 10 is positioned to control flow through the valve 5, and in the form shown is actuated (through a stem 11) by fluid-pressure-responsive means in the form of a diaphragm 12. The valve-stem side of the diaphragm 12 may be in fluid-communication with the low-pressure side of the valve 5, as by means of a loose fit of valve-stem 11 in guide 13. The valve member 10 may be resiliently urged to a normal seated position by spring means 14, and the valve member 10 may be actuated against the force of spring means 14 by pilot-admitted fluid pressures in the space between diaphragm 12 and the hood 15, under the base of the main valve.

The pilot-valve unit 6 may, as shown in my said Patent No. 2,639,556, be formed integrally with the cover or bonnet 16 usually provided over the bonnet opening 17 on the high-pressure side of the main valve 5. In such construction, the pilot 6 may include a pilot-valve member 18 normally urged in an open direction by resilient means 19, shown adjustably supported within a dome 20 vented at 20'. Pressure-responsive means in the form of a diaphragm 21 may oppose the force of spring 19 and thus control the placement of the pilot-valve member 18, in response to control pressure admitted through a control part 22. Since the pilot valve 6 is enclosed in the cover or bonnet 16, it may be readily mounted upon and removed from the main valve 5.

In the form shown, opposing flanges 16—23 (of the bonnet 16 and of the valve body 17) are tightly secured to each other by nuts 24 on studs 25 carried by the main-valve body. For protection against blow-out failures at the interfit of flanges 16—23, one of the flanges may be provided with a rim 26 closely fitting a skirt 27 on the other flange. As gasket 28, retained by skirt 27 assures a sealing relationship of these interfitting parts, regardless of the pressure on the high-pressure side of the system.

In accordance with a feature of the invention, I provide a novel construction for pilot-valve unit 6, featuring such employment of materials of elevated hardness as to assure prolonged life without the requirement for replacement of parts. The entire pilot-valve and bonnet assembly 6—16, including the valve member 18, may all be made of such material, but this presents difficult machining problems, and the cost would be unnecessarily high. I achieve the desired results with a minimum use of material of elevated hardness by employing what I term a "pilot-valve-body member" 30, sealingly secured as by a circumferential weld 31 to the bonnet member 16. The pilot-valve-body member 30 may be cut from bar stock of the material of elevated hardness. This material may be a tough chromium-alloy steel, which preferably has a hardness substantially exceeding the hardness of ordinary steel, that is, the Brinnell hardness may be of the order of 260, and is preferably in the range from 230 to 300.

In the form shown, the pilot-valve-body member 30 has reduced ends fitting the bonnet member 16 and the pilot-valve chamber member 32, and a circumferential weld 33 permanently secures and seals the pilot-valve body member 30 to the chamber member 32. Body member 30 is bored for close sliding accommodation of the stem 34 for the pilot-valve member 18. A seat member 35 is removably threaded to the bonnet end of the body member 30, and is also of a tough material of elevated hardness, as indicated above for the valve member 18 and for body member 30. A nut 36 at the other end of the stem 34 provides means to receive resilient action from a weak spring 37, to urge a seated relation of the valve member 18, and to urge contact of the valve stem with suitable abutment means 38 on the diaphragm 21.

As a protection for the valve member 18 when the pilot-valve unit is removed from the bonnet opening, a tubular skirt member 39 may be welded to the underside of flange or bonnet member 16, so as to surround the pilot-valve member 18 and to project towards the main valve a greater distance than the pilot-valve member 18 will ever project.

It will be noted that the described pilot-valve construction features a permanent sealing relation at welds 31—33 between the body member 30 and the bonnet and hood parts 16—32 to which it is secured. These are joints at which materials of different hardness are fitted; and, without such seals as I have described, the leaks which would otherwise develop under conditions of extreme high-pressure use, could result in wire-drawing and, therefore, damage to the softer metal. In the case shown, this would mean the need for complete replacement of the pilot-valve assembly, were it not for the permanent circumferential welds at 31—33. By employing a replaceable valve-seat member 35, insertably carried in the pilot-valve body 30 (both parts 35—30 having substantially the same elevated hardness), I assure that any small leaks between these parts will result in the most negligible destruction, if any. Also, the fact that the gland portion of the valve stem 34 (at its guided fit with the body member 30) also involves a fit of parts having essentially the same elevated hardness, assures a minimum of wear due to friction or to wire-drawing.

For the type of pilot valve 6 and main valve 5 shown, pressure-regulating functions may be obtained by providing fluid-communicating means from the low-pressure side of the pilot-valve member 18 to the high-pressure side of the fluid-pressure-actuated means 12 for the main valve, and by providing a bleed connection for exhausting the low-pressure side of the pilot-valve member 18, as to the low-pressure side of the main valve 5. In accordance with a further feature of the invention, I provide readily detachable connector means between the pilot-valve unit and the pressure-responsive actuating means for the main valve, in order to achieve such functions. Such detachable connector means may be considered as a single unit, as in the case of the aforementioned Patent No. 2,639,556, but in the form shown this single unit itself includes readily detachable parts; thus, a first connector means 40 is shown connecting the high-pressure side of the pressure-responsive actuating means 12 to the downstream side 9 of the main valve, as at the location suggested in Fig. 1, at dotted line 41. In the form shown, the connection of member 40 to the point 41 includes a three-element adaptor or T-fitting 42; connector 40 may be detachably coupled to one branch of the fitting 42, by means of a union nut 43, and to the pressure-responsive actuating means 12 by means of a further union nut 44. The adaptor member 42 may be removably attached to the valve body 7, and in the form shown I have inserted a bleed fitting 39 between adaptor 42 and the valve body. A second connector 45 readily detachably connects the remaining leg of the adaptor 42 to the pilot valve, as by means of union nuts 46—47.

In operation, in the absence of a suitably elevated control pressure at port 22, the pilot-valve member 18 will be urged to an open position by spring 19. This will pass high-pressure fluid from the upstream side of the main valve to the high-pressure side of pressure-responsive actuating means 12, subject to the continuous bleed exhaust at 39. Under these conditions, the main-valve member 10 will be held open. When the control pressure at port 22 develops to a sufficiently elevated extent to overcome the force of spring 19, the pilot will tend to close, with resultant closing action of the main valve.

It will be seen that I have described an extremely rugged valve construction that lends itself to prolonged operation at very high pressures. These results are achieved with maximum facility for servicing and maintenance, particularly where the control passages are concerned.

While I have described my invention in detail for the preferred form shown, it will be understood that modifications may be made within the scope of the invention as defined in the claims which follow.

I claim:

1. In a regulating valve, a valve body having an inlet opening and an outlet opening, a main-valve member for controlling the passage of fluid between said openings, pressure-responsive means carried by said body and connected for actuating said main-valve member, said body having a bonnet opening communicating with said inlet opening and overstanding said main-valve member, and a unit pilot-valve and bonnet for said opening, said unit including a bonnet member secured over the bonnet opening of said valve body and having a pilot-valve opening therein, a pilot-valve-body member fitted in said pilot-valve opening and sealingly welded thereto, a pilot-valve-seat member removably secured to said pilot-valve-body member at the end within said bonnet opening, a pilot-valve member with stem means reciprocably guided in said pilot-valve-body member and seated on said seat, said pilot-valve-body member and said pilot-valve-seat member and said pilot-valve member being of substantially the same hardness, said hardness being elevated with respect to that of said bonnet member, actuating means for said pilot-valve member and carried by said pilot-valve-body member, connecting means on said unit for connecting the low-pressure side of said pilot-valve member to said first-mentioned pressure-responsive means, and bleed-connecting means on said unit for bleeding the low-pressure side of said pilot-valve member to the outlet side of said valve body.

2. A valve structure in accordance with claim 1 wherein the pressure responsive means for operating the main valve includes, a valve stem connected to said main-valve member, spring means surrounding the valve stem and abutting against said valve body for biasing said main-valve member to a closed position, a fluid-pressure responsive diaphragm positioned adjacent the end of the valve stem for biasing said main-valve member to the open position when fluid pressure is applied over said diaphragm, said connecting means and said bleed-connecting means including an inverted T union positioned on said valve body in communication with the down-stream side of said main valve, said T union being provided with a bleed port in the leg of the T member communicating with the down-stream side of said main valve, a line communicating with the low pressure side of said pilot valve member and connected to the upstanding leg of the T union, and a second line connected to the leg of the T union opposite the leg provided with the bleed port and communicating with the diaphragm chamber of said main valve.

References Cited in the file of this patent

UNITED STATES PATENTS

| | | |
|---|---|---|
| 871,260 | Dyer | Nov. 19, 1907 |
| 1,258,903 | Howard | Mar. 12, 1918 |
| 1,268,511 | String | June 4, 1918 |
| 2,155,170 | Odend'hal | Apr. 18, 1939 |
| 2,185,713 | Spence | Jan. 2, 1940 |
| 2,639,556 | Spence | May 26, 1953 |
| 2,662,546 | Nelson | Dec. 15, 1953 |

FOREIGN PATENTS

| | | |
|---|---|---|
| 107,537 | Great Britain | July 5, 1917 |
| 855,259 | France | Feb. 2, 1940 |